(12) United States Patent
O'Neil

(10) Patent No.: US 11,781,647 B2
(45) Date of Patent: Oct. 10, 2023

(54) HYDRAULIC SYSTEM AND METHOD FOR OPERATION OF SAID SYSTEM

(71) Applicant: Dana Automotive Systems Group, LLC, Maumee, OH (US)

(72) Inventor: Thomas M. O'Neil, Holland, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 8 days.

(21) Appl. No.: 17/446,411

(22) Filed: Aug. 30, 2021

(65) Prior Publication Data

US 2022/0065345 A1    Mar. 3, 2022

Related U.S. Application Data

(60) Provisional application No. 63/072,723, filed on Aug. 31, 2020.

(51) Int. Cl.
| | |
|---|---|
| *F16H 61/02* | (2006.01) |
| *F16H 63/34* | (2006.01) |
| *F16H 63/30* | (2006.01) |
| *F16H 61/30* | (2006.01) |

(52) U.S. Cl.
CPC ..... *F16H 61/0206* (2013.01); *F16H 61/0251* (2013.01); *F16H 61/30* (2013.01); *F16H 63/3026* (2013.01); *F16H 63/3483* (2013.01)

(58) Field of Classification Search
CPC .. F16H 61/0206; F16H 61/0251; F16H 61/30; F16H 2061/0209; F16H 61/0009; F16H 2061/0037; F16H 63/3026; F16H 63/3483; F16H 57/021; F16H 57/0436; F16H 57/0471; F16H 3/089; F16H 37/082; F16H 2003/0818; F16H 2200/0021; F16H 2200/0034; F16H 61/0025; F16H 1/06; F16H 57/037; F16H 57/0423; F16H 57/0424; F16H 57/0435; B60K 1/00; B60K 2001/001; F16D 25/10; F16D 25/14; F15H 57/0473
See application file for complete search history.

(56) References Cited

U.S. PATENT DOCUMENTS

| | | | |
|---|---|---|---|
| 4,255,091 A | 3/1981 | Dike, Jr. | |
| 4,262,554 A | 3/1981 | Ahlen et al. | |
| 5,311,740 A | 5/1994 | Shiba et al. | |
| 7,264,085 B2 | 9/2007 | Ikeda | |
| 8,673,340 B2 | 3/2014 | Rosenthal | |
| 10,060,526 B2 | 8/2018 | Dial et al. | |
| 10,316,954 B2 * | 6/2019 | Song | F16H 57/0473 |
| 10,883,548 B2 * | 1/2021 | Lee | F16H 48/11 |

(Continued)

*Primary Examiner* — Jacob S. Scott
*Assistant Examiner* — Farhana Pervin
(74) *Attorney, Agent, or Firm* — McCoy Russell LLP

(57) ABSTRACT

Methods and systems for hydraulic actuation of axle system components are provided. A hydraulic system in an electric axle, is provided in one example, which includes a housing with a plurality of sections that enclose an electric motor and a gearbox, the system further includes a hydraulic pump that is coupled to the housing and configured to supply pressurized fluid to a solenoid valve through a plurality of fluid passages. The hydraulic system further includes a clutch in the gearbox configured to receive the pressurized fluid from the solenoid valve through a hydraulic passage internally routed through the housing.

20 Claims, 3 Drawing Sheets

(56) References Cited

U.S. PATENT DOCUMENTS

| | | | |
|---|---|---|---|
| 11,300,036 B2* | 4/2022 | Goto | F16H 57/0476 |
| 11,402,015 B2* | 8/2022 | Weinhardt | F15B 13/0444 |
| 11,480,220 B2* | 10/2022 | Isami | F16D 11/14 |
| 2015/0128737 A1* | 5/2015 | Ono | F16H 63/3026 |
| | | | 74/473.11 |
| 2018/0334025 A1* | 11/2018 | Hashimoto | B60K 1/02 |
| 2020/0318730 A1* | 10/2020 | Heubner | F16H 3/006 |
| 2020/0378492 A1* | 12/2020 | Van Druten | F16H 61/0206 |
| 2022/0316582 A1* | 10/2022 | Inoue | F16H 57/0476 |

\* cited by examiner

HYDRAULIC SYSTEM AND METHOD FOR OPERATION OF SAID SYSTEM

CROSS REFERENCE TO RELATED APPLICATION

The present application claims priority to U.S. Provisional Application No. 63/072,723, entitled "HYDRAULIC SYSTEM AND METHOD FOR OPERATION OF SAID SYSTEM", and filed on Aug. 31, 2020. The entire contents of the above-listed application are hereby incorporated by reference for all purposes.

TECHNICAL FIELD

The present disclosure relates to a hydraulic system in an electric axle and a method for operation of said system.

BACKGROUND AND SUMMARY

Gearboxes have utilized hydraulic systems to actuate devices such as clutches and shift forks. Certain hydraulic systems include electro-hydraulic valves designed to engage forwards and reverse drive gears, which allows the vehicle to operate in a variety of drive modes. However, these hydraulic systems have posed packaging challenges. Previous systems have, for example, included sumps and valves in bulky enclosures. These hydraulic components may demand relatively lengthy manufacturing and assembly procedures and hamper the use of the system in space-constrained vehicle platforms, in certain cases. Furthermore, incorporating hydraulic systems into electric axle gearboxes presents additional challenges related to packaging and manufacturing. For instance, packaging challenges may arise when incorporating a suspension system into the electric axle. Additionally, bulky electric axle arrangements may, in certain circumstances, be more susceptible to degradation from road debris and other environmental factors.

To overcome at least some of the aforementioned challenges, a hydraulic system in an electric axle is provided. The hydraulic system includes, in one example, a housing that includes a plurality of sections that enclose an electric motor and a gearbox. The system further includes a hydraulic pump. The hydraulic pump is coupled to an outer surface of one of the plurality of housing sections, configured to receive a fluid from a sump, and configured to supply pressurized fluid to a solenoid valve through a plurality of fluid passages. The hydraulic system further includes a clutch in the gearbox. The clutch is configured to receive the pressurized fluid from the solenoid valve through a hydraulic passage internally routed through the one of the plurality of housing sections. The clutch is further designed to adjust a clutch state based on a pressure of the fluid. In this way, the hydraulic system is compactly routed through electric axle housing. Due to the space efficient design, the system's applicability and customer appeal is expanded. The system may accordingly be used in a wide range of vehicle platforms. The system's space efficient profile further drives down the chance of the hydraulic components experiencing degradation due to road debris or other environmental factors. Designing the hydraulic passages in this manner further enables the hydraulic system to be more easily serviced by forgoing the removal of the axle housing to access components such as the solenoid valves and the pump, if desired.

In another example, the hydraulic passages may be cast or machined into the one of the housing sections to form a monolithic metal structure. In this monolithic housing structure, the passages traverse a wall of the housing. In this way, the passages may be space efficiently formed in the axle housing. Forming a monolithic housing structure with passages routed therethrough allows the system's manufacturing process to be simplified when compared to systems with externally routed hydraulic lines which may demand further installation steps.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are drawn approximately to scale. However, other relative dimensions may be used, in other embodiments.

DETAILED DESCRIPTION

Hydraulic system embodiments are described herein. The hydraulic system is designed to space efficiently route hydraulic conduits for gearbox clutch control through a gearbox housing. For instance, in one example, hydraulic conduits may be routed through interior channels in the housing that may be either cast or machined. This conduit routing configuration allows the system to be efficiently constructed and achieve greater compactness when compared to system's which use externally routed hydraulic hoses. The increased system compactness allows the system's applicability to be expanded, and can therefore be deployed in a wider-variety of vehicles. The efficient construction of the hydraulic system may also decrease production costs of the gearbox, if desired. The internal hydraulic conduit routing may also enable quicker clutch actuation to be realized, due to relatively close proximity between the actuation solenoids and the pistons in the corresponding clutches. Gearbox shifts may be consequently implemented with less lag which increases customer appeal. The quick shift response, may further enable clutch control to be more rapidly coordinated, thereby reducing shift time and power interruptions during gear shift operation.

Figure 1:
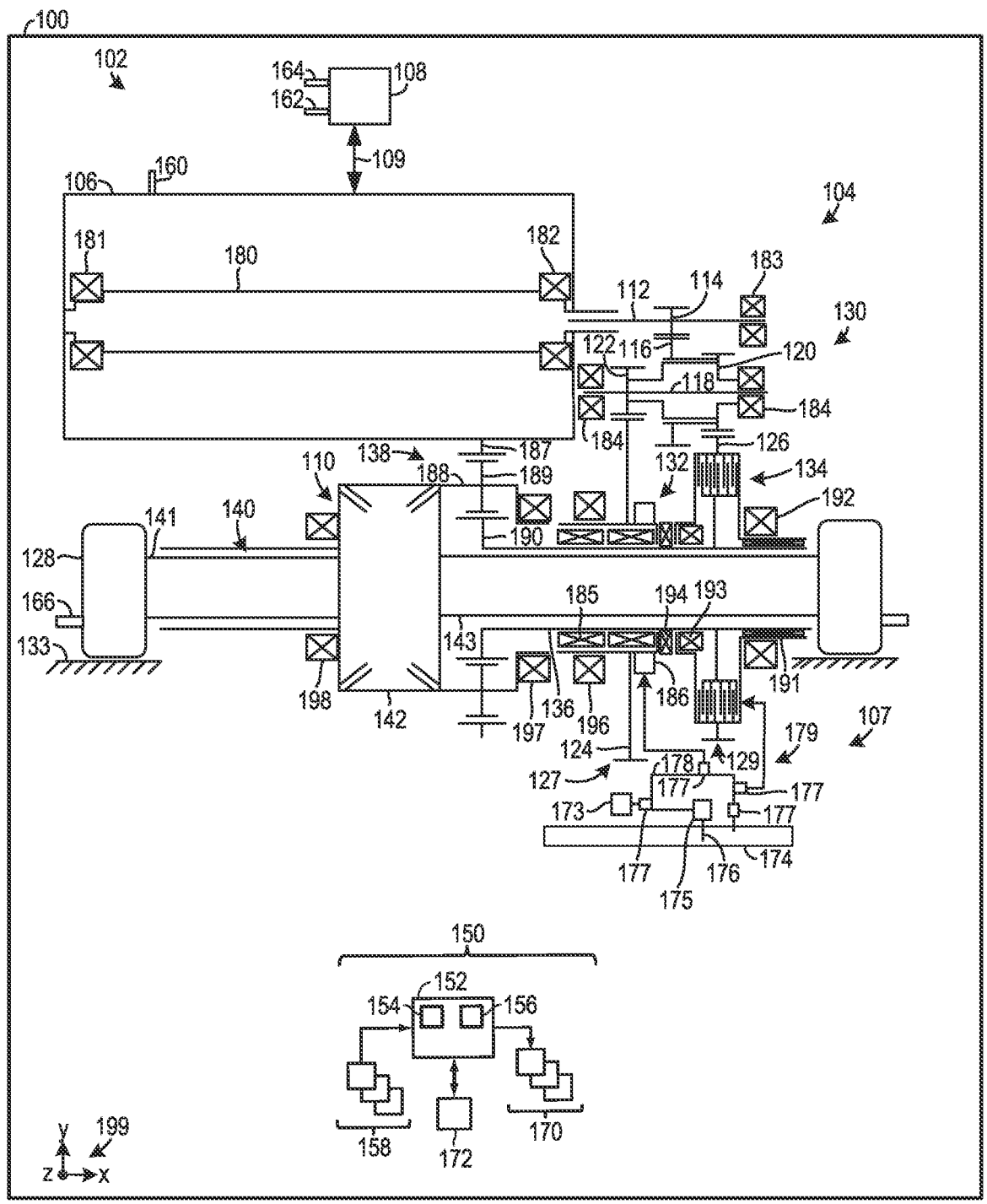
FIG. 1 shows a schematic representation of a vehicle including an electric axle with a gearbox and a hydraulic system.

FIG. 1 shows a schematic depiction of a vehicle 100 having an electric axle 102 with a gearbox 104, an electric motor 106 (e.g., electric motor-generator), and a hydraulic system 107. The stick diagram of FIG. 1 provides a high level topology of the vehicle, gearbox, and corresponding components. However, it will be understood that the vehicle, gearbox, and corresponding components have greater structural complexity than is captured in FIG. 1. The structural details of various facets of the gearbox 104 are illustrated, by way of example, in greater detail herein with regard to FIGS. 2-3.

The electric motor 106 may be electrically coupled to an energy storage device 108 (e.g., battery, capacitor, and the like). Arrows 109 signify the energy transfer between the electric motor 106 and the energy storage device 108 that may occur during different modes of system operation. The electric motor 106 may include conventional components for generating rotational output (e.g., forward and reverse drive output) and/or electrical energy for recharging the energy storage device 108 such as a rotor which electromagnetically interacts with a stator to provide the aforementioned energy transfer functionality. The electric motor 106 is shown including a rotor shaft 180 with a first bearing 181 and a second bearing 182 coupled thereto. The first bearing 181 may be a fixed bearing and the second bearing 182 may be a floating bearing. Although the second bearing 182 is shown positioned within the electric motor, the bearing 182 may be coupled to the input shaft to facilitate rotation thereof, in other embodiments. Other bearing arrangements with regard to the electric motor have been contemplated such as arrangements with alternate quantities and/or types of bearings.

The vehicle may take a variety of forms, in different embodiments. For example, the vehicle 100 may be hybrid vehicle where both the electric motor 106 and an internal combustion engine are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to a differential 110 or other suitable locations in the gearbox 104. In yet another use-case hybrid vehicle configuration, the engine may provide rotational input to another drive axle. Further, in other examples, the vehicle may be an all-electric vehicle (EV) where the internal combustion engine is omitted.

The rotor shaft 180 of the electric motor 106 may be coupled to an input shaft 112. For instance, the rotor shaft 180 may be transition fit, slip fit, mechanically attached, in splined engagement, combinations thereof, and the like with an end of the input shaft 112. A first gear 114 is positioned or formed on the input shaft 112. A bearing 183 is shown coupled to the input shaft 112. The bearing 183 may be a fixed bearing, in one example. However, in other examples, the bearing 183 may be another suitable type of bearing or in some cases may be omitted from the system.

A second gear 116 may be rotationally coupled to the first gear 114 and resides on an intermediate shaft 118. As described herein, rotational coupling between gears or other components may include an interface between the gears where teeth of the gears mesh to facilitate rotational energy transfer therebetween. As such, rotational coupling of the components allows for rotational energy transfer between the corresponding components. Conversely, rotational decoupling may include an arrangement between two components when rotational energy is substantially inhibited from being transferred between the components.

A third gear 120 and a fourth gear 122 may be included on the intermediate shaft 118, although other gearing arrangements have been envisioned. Bearings 184 (e.g., tapered roller bearings) may be coupled to either axial end of the intermediate shaft 118 to support the shaft and facilitate rotation thereof. The tapered roller bearings may decrease the axle package width when compared to other types of bearing such as ball bearings. However, other suitable intermediate shaft bearing types and/or arrangements have been envisioned. The bearing arrangement on the intermediate shaft as well as the other bearing arrangements described herein may be selected based on expected shaft loading (e.g., radial and thrust loading), gear size, shaft size, etc.

Continuing with the gearbox description, the fourth gear 122 may be rotationally coupled to a fifth gear 124, and the third gear 120 may be rotationally coupled to a sixth gear 126. The first gear 114, the second gear 116, the third gear 120, the fourth gear 122, the fifth gear 124, and the sixth gear 126 may be included in a gear assembly 130, in the illustrated embodiment. However, the gear assembly may include an alternate number of gears and/or have a different layout, in other embodiments. The number of gears in the assembly and the assembly layout may be selected based on end-use design goals which may be related to targeted gear range and packaging, for instance.

The first gear 114, the second gear 116, the fourth gear 122, and the fifth gear 124, may be included in a first gear set 127. Additionally, the first gear 114, the second gear 116, the third gear 120, and the sixth gear 126 may be included in a second gear set 129. The first gear set 127 may have a higher gear ratio than the second gear set 129, in one example. However, other gear arrangements in the different gear sets may be used, in other examples. Clutch assemblies in the electric axle 102 allow the first gear set 127 or the second gear set 129 to be placed in an operational state. To elaborate, the clutch assemblies allow the active gear ratio in the gear assembly 130 arranged between the electric motor 106 and the drive wheels 128 on driving surfaces 133, a planetary gear assembly 138, and the differential 110, to be adjusted. For instance, the clutch assemblies may be operated to engage the first gear set 127, during certain conditions (e.g., towing, lower speed vehicle operation, and the like), and engage the second gear set 129, during other conditions (e.g., higher speed vehicle operation). As such, the system may transition between the different gear sets based on vehicle operating conditions, driver input, and the like. In this way, the gearbox has distinct selectable gear ratios which allows the gearbox to be adapted for different driving conditions, as desired. It will be appreciated that the gear ratio adjustability may be utilized to increase electric motor efficiency, in some cases.

The electric axle 102 may specifically include a first clutch assembly 132 and a second clutch assembly 134. The first clutch assembly 132 is configured to rotationally couple and decouple the fifth gear 124 from an output shaft 136. Likewise, the second clutch assembly 134 functions to rotationally couple and decouple the sixth gear 126 from the output shaft 136. The first clutch assembly 132 may include a one-way clutch 185 (e.g., sprag clutch) and a locking clutch 186 (e.g., a dog clutch) working in conjunction to accomplish the coupling/decoupling functionality in a compact arrangement. The locking clutch 186 may include a shift fork which selectively couples the outer carrier of the one-way clutch to the output shaft 136. Thus, the locking clutch may prevent one-way clutch freewheel operation during selected periods (e.g., during regenerative or reverse operating modes). The second clutch assembly 134 may be a wet friction clutch providing smooth engagement/disengagement, in one embodiment. However, in other examples, the second clutch assembly 134 may include additional or alternate types of suitable clutch devices such as electromagnetic devices.

The output shaft 136 may be rotationally coupled to the planetary gear assembly 138, in the illustrated embodiment. The planetary gear assembly 138 may include a ring gear 187, a carrier 188 with planet gears 189 mounted thereon, and a sun gear 190 which provides a space efficient design capable of achieving a relatively high gear ratio in comparison to non-planetary arrangements. In the illustrated embodiment, the sun gear 190 is rotationally coupled to the output shaft 136 and the carrier 188 is rotationally coupled to the differential 110 (e.g., a differential case). However, in alternate examples, different gears in the planetary assembly may be rotationally coupled to the output shaft and the differential. Further, in one example, the components of the planetary gear assembly 138 may be non-adjustable with regard to the components that are held stationary and allowed to rotate. Thus, in one use-case example, the ring gear 187 may be held substantially stationary and the carrier 188, planet gears 189, and the sun gear 190 and the gears rotational state may remain unchanged during gearbox operation. However, in alternate embodiments, the sun gear or the carrier may be held stationary. In the illustrated embodiment, the ring gear 187 is fixedly coupled to the electric motor housing, to increase system space efficiency. However, the ring gear may be fixedly coupled to other vehicle structures, in other instances. By using a non-adjustable planetary assembly, gearbox operation may be simplified when compared to planetary arrangements with gears which have rotational state adjustability. However, adjustable planetary arrangements may be used in other system embodiments.

Various bearings may be coupled to the output shaft 136 and the planetary gear assembly 138 to enable rotation of components coupled to the shaft and assembly and in some cases support the components with regard to radial and/or thrust loads. A bearing 191 (e.g., needle roller bearing) is shown coupled to the output shaft 136 and the second clutch assembly 134.

A bearing 192 (e.g., tapered roller bearing) is shown coupled to the second clutch assembly 134. A bearing 193 (e.g., floating bearing) is also shown coupled to the second clutch assembly 134 and the output shaft 136. A bearing 194 (e.g., thrust bearing) may also be positioned axially between and coupled to the sixth gear 126 and the first clutch assembly 132. A bearing 196 (e.g., fixed bearing) may further be coupled to the one-way clutch 185. A bearing 197 (e.g., ball bearing) is shown coupled to the planetary gear assembly 138 and a bearing 198 (e.g., ball bearing) is shown coupled to the differential case 142. However, other suitable bearing arrangements have been contemplated, such as arrangements where the quantity and/or configurations of the bearings are varied.

FIG. 1 further depicts the planetary gear assembly 138 directly rotationally coupled to the differential 110. Thus, the planetary gear assembly may serve as a final drive unit, in one example. Directly coupling the planetary gear assembly to the differential increases system compactness and simplifies system architecture. In other examples, however, intermediate gearing may be provided between the planetary gear assembly and the differential. In turn, the differential 110 is designed to rotationally drive an axle 140 coupled to the drive wheels 128. The axle 140 is shown including a first shaft 141 and a second shaft 143 coupled to different drive wheels 128. Furthermore, the axle 140 is shown arranged within (e.g., co-axial arranged within) the output shaft 136 which allows a more space efficient design to be achieved. However, offset axle-output shaft arrangements may be used, in other examples.

Further in one example, the axle 140 may be a beam axle. A beam axle, also referred to in the art as a solid axle or rigid axle, may be an axle with mechanical components that structurally support one another and extend between drive wheels coupled to the axle. Thus, wheels coupled to the axle may move in unison when articulating, during, for example, vehicle travel on uneven road surfaces. To elaborate, the camber angle between the wheels may be substantially constant regardless of the where the axle is in the suspension stroke. For instance, the beam axle may be a structurally continuous axle which spans the drive wheels on a lateral axis, in one embodiment.

The differential 110 may include a case 142 which houses gearing such as pinion gears, side gears, and the like to achieve the aforementioned energy transfer functionality. To elaborate, the differential 110 may be an electronic locking differential, in one example. In another example, the differential 110 may be an electronic limited slip differential or a torque vectoring dual clutch. In yet other examples, an open differential may be used. Referring to the locking differential example, when unlocked, the locking differential may allow the two drive wheels to spin at different speeds and conversely, when locked, the locking differential may force the drive wheels to rotate at the same speed. In this way, the gearbox configuration can be adapted to increase traction, under certain driving conditions. In the case of the limited slip differential, the differential allows the deviation of the speed between shafts 141, 143 coupled to the drive wheels 128 to be constrained. Consequently, traction under certain road conditions (e.g., low traction conditions such as icy conditions, wet conditions, muddy conditions, etc.) may be increased due to the wheel speed deviation constraint. In the torque vectoring dual clutch example, the differential may allow for torque delivered to the drive wheels to be independently and more granularly adjusted to again increase traction during certain driving conditions. The torque vectoring dual clutch may therefore provide greater wheel speed/torque control but may, in some cases, be more complex than the locking or limited slip differentials.

The gearbox 104 may further include a park lock device 173. The park lock device 173 may be configured to ground the output shaft 136 and/or the fifth gear 124 during selected conditions. This component grounding may occur when the vehicle is stationary (e.g., parked) to hold the vehicle in motionless state. The park lock device 173 may be formed as a clutch hydraulically actuated via a clutch piston, in one example. The park lock device 173 may include a stationary ground component that selectively engages the output shaft and/or the fifth gear to hold the gearbox substantially stationary.

The electric axle 102 may further include the hydraulic system 107 designed to actuate clutches and other components in the gearbox 104. To achieve the component actuation functionality, the hydraulic system 107 may include a sump 174. The sump 174 may be formed in a gearbox housing, discussed in greater detail herein with regard to FIGS. 2-3. The hydraulic system 107 may further include a hydraulic pump 175 which may include a pick-up conduit 176 extending into the sump 174. The hydraulic pump 175 is fluidly coupled to a plurality of solenoid valves 177. A hydraulic conduit (e.g., feeder conduit) 178 may route the hydraulic fluid between the pump and the solenoid valves. The feeder conduit may be routed through the gearbox housing via passages that are cast or machined into the gearbox housing. The plurality of solenoid valves 177 may deliver hydraulic fluid to the first clutch assembly 132, the second clutch assembly 134, and/or the park lock device 173 via separate hydraulic conduits 179. The hydraulic conduits extending between the solenoids and the clutches may be routed through the gearbox housing via cast and/or machined passages. In this way, the space efficiency of the hydraulic system may be increased in comparison to hydraulic systems with externally routed conduits. To elaborate, the solenoid valves may route hydraulic fluid (e.g., oil based hydraulic fluid including petroleum oil, synthetic oil, and/or natural oil) to desired gearbox components. Further, in certain examples, the hydraulic fluid used by the solenoids may be jointly deployed for gear lubrication. For instance, the gearbox may utilize a lubrication system which pulls lubrication fluid from the sump for gear and clutch lubrication. Both splash and/or pressure type lubrication system embodiments have been envisioned.

A distinct solenoid may be coupled to each of the first clutch assembly 132, the second clutch assembly 134, and/or the park lock device 173. These solenoids may independently regulate the pressure of fluid delivered to the clutches and the park lock device. The pressurized fluid may be routed to hydraulic pistons and/or other suitable components in the clutches and park lock device which induce engagement and disengagement of the devices. In some embodiments, the plurality of solenoid valves may include a regulator solenoid (e.g., main regulator solenoid) controlling fluid flow in the feeder conduit for the other solenoid valves. It will be appreciated that the solenoid valves are electronically actuated.

The vehicle 100 may further include a control system 150 with a controller 152. The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random access memory, read only memory, keep alive memory, combinations thereof, and the like. Furthermore, it will also be understood that the memory 156 may include non-transitory memory.

The controller 152 may receive various signals from sensors 158 coupled various locations in the vehicle 100 and the electric axle 102. The sensors may include a motor speed sensor 160, an energy storage device temperature sensor 162, an energy storage device state of charge sensor 164, wheel speed sensors 166, and the like. The controller 152 may also send control signals to various actuators 170 coupled at different locations in the vehicle 100 and the electric axle 102. For instance, the controller 152 may send signals to the electric motor 106 and the energy storage device 108 to adjust the rotational speed and/or direction (e.g., forward drive rotational direction and reverse drive rotational direction) of the electric motor. The controller 152 may also send signals to the first clutch assembly 132 and the second clutch assembly 134 to adjust the operational gear ratio in the gearbox 104. For instance, the first clutch assembly 132 may be disengaged and the second clutch assembly 134 may be engaged to place the second gear set 129 in an operational state (transferring rotational energy between the electric motor 106 and the output shaft 136) or vice versa. Specifically, in one example, the controller may include instructions stored in the memory which cause the controller to transition a locking clutch in the first clutch assembly into an engaged state in response to receiving a request to initiate a reverse or regeneration mode, for example. The other controllable components in the vehicle and gear system may function in a similar manner with regard to command signals and actuator adjustment. For instance, the differential 110 may receive command signals from the controller 152.

The controller 152 may be designed to operate the gearbox 104 in different gear modes of operation (e.g., a first gear mode, a second gear mode, a park mode, a reverse mode, and/or a regeneration mode). As previously indicated, to place the gearbox 104 in these different modes the solenoid valves which are fluidly coupled to the clutches may receive control commands and actuators in these devices may place the clutches in different configurations (e.g., engaged and disengaged configurations). The controller 152 may further be designed to transition the gearbox 104 between the different modes of operation based on vehicle operating conditions.

The vehicle 100 may further include one or more input devices 172 (e.g., a gear selector such as a gear stick, gear lever, and the like, a brake pedal, an accelerator pedal, a console instrument panel, a touch interface, a touch panel, a keyboard, combinations thereof, and the like). The input device(s) 172, responsive to driver input, may generate a mode request which indicates a desired operating mode for the gearbox. For instance, in a use-case example, the driver may shift a gear selector into a gear mode (e.g., the first gear mode or second gear mode) to generate a gear set modal transition request at the controller. In response, the controller commands gearbox components (e.g., the first clutch assembly 132 and the second clutch assembly 134) to initiate a transition into a first gear mode, where the first gear set 127 is operational, from a second gear mode, where the second gear set 129 is operational, or vice versa. Other mode transitions have been contemplated such as a modal transition into a forward drive mode from a reverse drive mode or vice versa responsive to driver input received from the input device 172. However, in other examples more automated gearbox mode transitions may be implemented. For instance, the controller may automatically place the gearbox in the first gear mode or the second gear mode based on vehicle speed and/or load, for example. The controller 152 may be configured to transition the electric axle 102 into a regenerative mode. In the regenerative mode, energy is extracted from the gearbox using the electric motor 106 and may be transferred to the energy storage device 108. For instance, the electric motor 106 may be placed in a generator mode where at least a portion of the rotational energy transferred from the drive wheels to the generator by way of the gearbox is converted into electrical energy. A variety of different modal control strategies have been contemplated.

Figure 2:
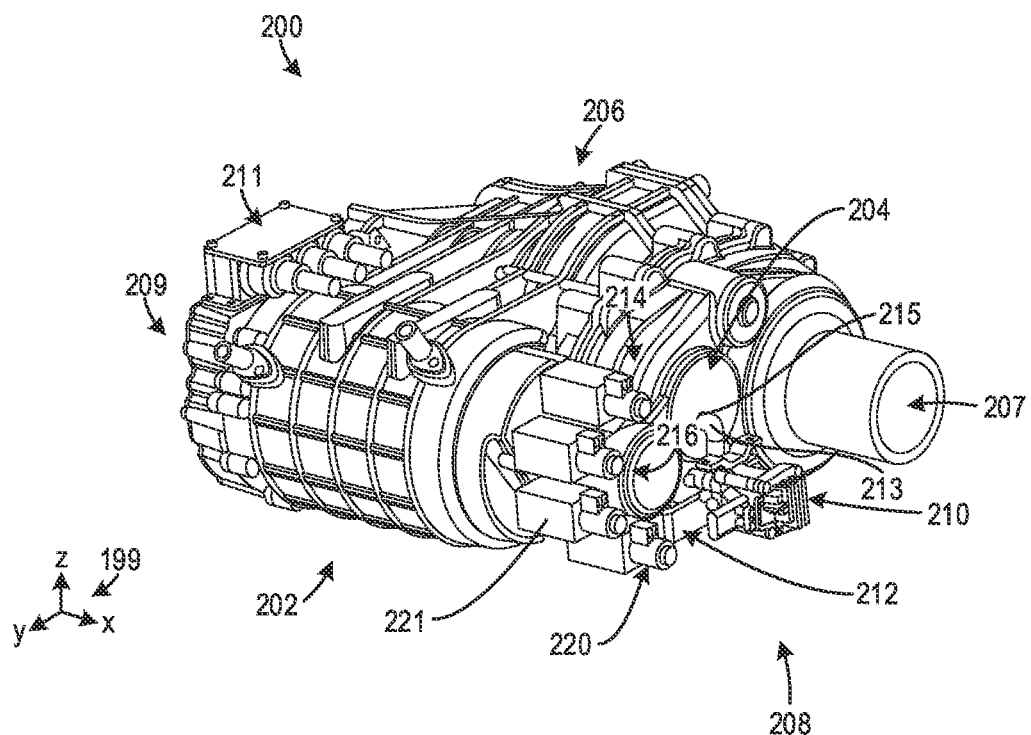
FIG. 2 shows a perspective view of an example of an electric axle with a hydraulic system.
Figure 3:
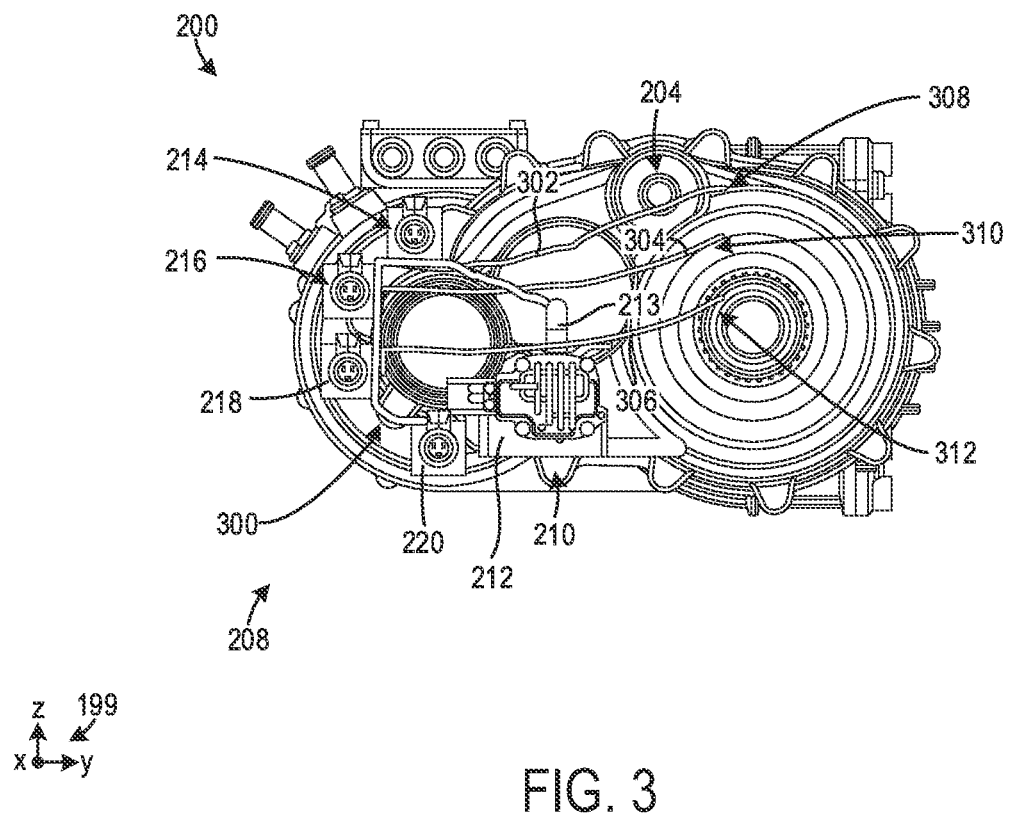
FIG. 3 shows a plan view of the electric axle and hydraulic system depicted in FIG. 2.

An axis system 199 is provided in FIG. 1 as well as FIGS. 2-3, for reference. The axis system includes a z-axis which may be parallel to a gravitational axis, an x-axis which may be a lateral axis, and a y-axis which may be a longitudinal axis, in one embodiment. However, the axes may have other orientations, in other embodiments.

FIG. 2 shows an electric axle 200 with a hydraulic system 208. The electric axle 200, shown in FIG. 2, serves as an example of the electric axle 102 and hydraulic system 107, shown in FIG. 1. As such, at least a portion of the functional and structural features of the electric axle 102 shown in FIG. 1 may be embodied in the electric axle 200 shown in FIG. 2 or vice versa, in certain examples. For example, the electric axle 200 may include a gearbox and electric motor similar to the gearbox 104 and the electric motor 106, shown in FIG. 1.

The electric axle 200 includes a housing with a plurality of sections which at least partially enclose a gearbox and an electric motor. To elaborate, a first housing section 202 may at least partially enclose the electric motor and gearbox. A second housing section 204 and a third housing section 206 removably attached to the first housing section 202 and further encloses the gearbox. These housing sections may provide efficient access to the gear train in the gearbox and the final drive unit. The second housing section may include an axle shaft opening 207 and the first housing section 202 may include an opposing axle shaft opening. Other housing section partitions that are profiled to account for factors such packaging goals, chassis design, and suspension design may be used in alternate embodiments. A fourth housing section 209 may be coupled to the first housing section 202. FIG. 2 further depicts an electrical interface 211 which extends from the housing section 209. However, other electrical interface locations are within the scope of the present disclosure. The electrical interface 211 may be designed as a high voltage three phase interface, although the type of interface may correspond to the type of electric motor deployed in the electric axle.

The hydraulic system 208 is shown coupled to the second housing section 204 which may enclose axial ends of an input shaft, an intermediate shaft, and an output shaft in the gearbox. However, at least a portion of the hydraulic system components may be attached to the first and/or third housing sections 202, 206.

The hydraulic system 208 includes a hydraulic pump 210. The hydraulic pump 210 may be coupled to a filter 212 via a pick-up tube or other suitable conduit. The filter 212 may be at least partially arranged in a sump within the axle's internal enclosure. To elaborate, the filter may be arranged near a lower point (e.g., lowest point) in the sump to facilitate fluid uptake via the pump. The boundary of the internal enclosure may be defined by the housing sections 202, 204, and 206.

The hydraulic pump 210 may include an outlet conduit 213 which extends through the second housing section 204. A seal 215, such as an O-ring, may be arranged at the interface between the outlet conduit 213 and the second housing section 204.

The hydraulic system 208 may further include, a first solenoid valve 214, a second solenoid valve 216, a third solenoid valve 218, and/or a fourth solenoid valve 220 (e.g., regulator solenoid valve). Each of the solenoid valves may include a valve body 221 which may be coupled the housing section 204. Seals may be provided at the interfaces between the solenoid valve outlets and the second housing section 204.

The first solenoid valve 214 may be in fluidic communication with a park lock device (e.g., park lock device 173, shown in FIG. 1). The second solenoid valve 216 may be in fluidic communication with a shift fork or other actuation device in a second clutch assembly (e.g., clutch assembly 134 shown in FIG. 1). The third solenoid valve 218 may be in fluidic communication with a friction clutch or other suitable clutch assembly such as the clutch assembly 132 shown in FIG. 1. The fourth solenoid valve 220 may a regulator solenoid designed to dump excess fluid into the axle's internal cavity. For instance, when the other solenoids suspend fluid routing to the clutch to which they are attached, the fourth solenoid valve 220 may expel the excess fluid into the internal cavity of the housing where it flows to the sump. The solenoid valves 214, 216, 218, 220 may be in fluidic communication with these clutches and the park lock device via hydraulic passages shown in detail in FIG. 3.

In one example, the solenoid valves 214, 216, 218, 220 and the hydraulic pump 210 may be covered via a shield (e.g., sheet metal shield). The shield may be removable which enables the underlying hydraulic components to be efficiently accessed and serviced.

FIG. 3 again depicts the hydraulic pump 210, the filter 212, the first solenoid valve 214, the second solenoid valve 216, the third solenoid valve 218, and the fourth solenoid valve 220 in the hydraulic system 208. A pressurized cavity 300 in the hydraulic system 208 routes fluid to the solenoid valves 214, 216, 218, 220 from the outlet conduit 213 of the hydraulic pump 210. The pressurized cavity 300 allows the solenoids to plug directly into a cavity functioning as a plenum for the hydraulic fluid. The pressurized cavity 300 may be internally routed through the second housing section 204 via internal tubing and/or internal cavities, in one embodiment. The pressurized cavity may additionally or alternatively include external tubing which is routed between the pump and the solenoid, in other embodiments. Still further in an alternate embodiment, the pump may be coupled to the solenoids via direct connection or other suitable paths designed to hold pressurized fluid. Routing fluid to the solenoids via the pressurized cavity allows the solenoids to be placed closer to the device which they actuate. Arranging the solenoids closer to the actuation devices (e.g., friction clutch piston, shift fork piston, park lock actuator, and the like) decreases actuation delays, thereby increase shift response.

The hydraulic system 208 further includes hydraulic passages 302, 304, 306. The hydraulic passage 302 extends between the first solenoid valve 214 and a park lock pressure cavity 308 internal to the second housing section 204. Thus, the hydraulic passage 302 may connect the park lock device's clutch piston to the solenoid valve body.

The hydraulic passage 304 extends between the second solenoid valve 216 and a shift fork pressure cavity 310 internal to the housing. Again, the hydraulic passage 304 fluidly couples the solenoid body to the clutch piston of the first clutch assembly (e.g., a locking clutch such as a dog clutch).

The hydraulic passage 306 extends between the third solenoid valve 218 and a friction clutch pressure cavity 312 internal to the axle housing. The hydraulic passage 306 therefore extends between the solenoid body and the friction clutch piston.

The solenoid valves 214, 216, 218 and the corresponding hydraulic passages 302, 304, 306 may be arranged at different vertical heights along the z-axis to decrease the length of the hydraulic passages. For example, the first solenoid valve 214 may be arranged higher than the second solenoid valve 216, to place the valve closer to the park lock pressure cavity interface. Thus, the solenoid valves may each have a different vertical height along the z-axis which corresponds to the pressure cavities to which they are hydraulically coupled. Spacing the solenoids apart, along the z-axis, allows cross-over of the passages which extend between the solenoids and the clutch, shift fork, and park lock device to be avoided, if wanted, thereby reducing hydraulic system complexity.

The hydraulic passages 302, 304, 306 may be formed in the second housing section 204. For instance, the passages may be cast or machined into the housing. In the cast passage example, the passages may internally traverse a selected section of the housing. On the other hand, in the machined passage example, the machined recesses may be sealed with an internal cover and arranged within the housing, for instance. In this way, the profile of the hydraulic system may be reduced when compared to systems with externally routed conduits. However, in certain examples, sections of the lines may include external tubing. Further in some examples, the hydraulic passages may include internal tubing, cavities, and/or other suitable types of path designed to hold pressurized hydraulic fluid. This internal routing further allows the hydraulic system's manufacturing costs to be reduced, if desired. In other examples, at least a portion of the passages may be drilled into the housing which may come with an increase in manufacturing costs. The internal hydraulic passages routing may allow serviceability to be simplified, by allowing the hydraulic components to be accessed, repaired, replaced, or otherwise manipulated without removing the axle housing, if desired. Internally routing hydraulic passages through the housing may further increase packaging adaptability, thereby increasing customer appeal.

Figure 4:
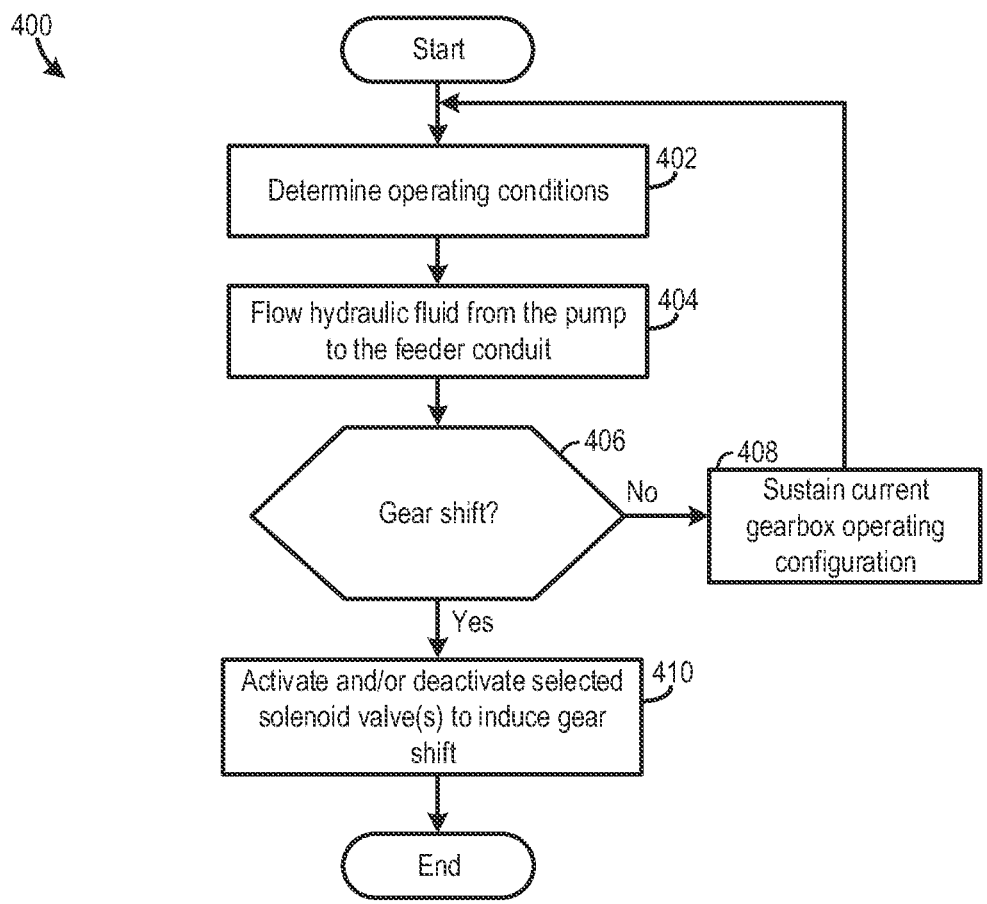
FIG. 4 shows a method for operation of a hydraulic system in an electric axle.

FIG. 4 shows a method 400 for operation of a hydraulic system in an electric axle. The method 400 may be implemented by one or more of the hydraulic systems, electric axles, components, and the like, described above with regard to FIGS. 1-3, in one embodiment, or may be implemented by another suitable hydraulic system and electric axle, in other embodiments. Furthermore, the method 400 may be implemented by a controller including memory holding instructions executable via a processor, as previously discussed.

At 402, the method includes determining operating conditions. The operating conditions may include a locking clutch position, friction clutch position, park lock device position, brake pedal position, accelerator pedal positon, one-way clutch state, vehicle speed, vehicle load, motor-generator temperature, motor-generator output speed, battery state of charge, and the like.

Next at 404, the method includes flowing hydraulic fluid from the pump to the feeder conduit. In one example, the pump may continuously flow fluid through the feeder conduit during axle operation to decrease actuation delays during a gear shift, for example.

At 406, the method includes determining if a gear shift operation has been requested. The gear shift request may be automatically generated via the controller based on vehicle speed, vehicle load, or combinations thereof. For example, a modal transition between the first and second gears may be implemented responsive to vehicle speed surpassing a threshold value (e.g., 15 kilometers per hour (km/h), 20 km/h, 25 km/h, etc.). Alternatively, the gear shift request may be generated responsive to operator interaction with a gear selector. For instance, the operator may place the gear selector in a first drive gear, a second drive gear, a park gear, or a reverse gear mode. However, gear selectors with different gearing options lie within the scope of the present disclosure. For instance, the gearbox may have more than three gears. Further, in the reverse gear mode, the first or second gear ratio may be operational and the motor may be spun in an opposite direction. Thus, the gearbox may transition between the different operating modes based on changes in vehicle operating conditions and/or operator input.

If gear shift operation has not been requested (NO at 406) the method moves to 408. At 408, the method includes maintaining the current gearbox operating configuration. For example, the gearbox may be sustained in the first or second forward drive gear modes. However, in another example, the gearbox may persist in a reverse mode of operation.

If gear shift operation has been requested (YES at 406) the method advances to 410, where the method includes activating and/or deactivating selected solenoid valve(s) to induce the requested gear shift. For example, gearbox may transition from a first gear to a second gear by activating the solenoid coupled to the friction clutch to induce operational engagement of the second gear set. During this transition, the solenoid coupled to the locking clutch (e.g., dog clutch) may be deactivated. In another example, when a park mode is selected via a gear selector, the solenoid coupled to the park lock device may be energized to place the park lock device in a locked state to hold the gearbox in a stationary state. In yet another example, the gearbox may transition from the second gear to the first gear by deactivating the friction clutch. In such an example, the one-way clutch device in the gearbox may engage, when the motor's output is a forward drive direction of rotation.

The technical effect of the systems and methods for hydraulic actuation of devices in the gearbox, described herein, is an increase in packaging efficiency which expands the system's applicability. Another technical effect of the systems and methods for hydraulic actuation described herein is to simplify manufacturing, assembly, and/or repair procedures, if so desired. Another technical effect of the systems and method described herein is quicker gear shift responsiveness.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the terms "approximately" and "substantially" may be construed to mean within five percent or less of a value or range unless otherwise specified.

The invention will be further described in the following paragraphs. In one aspect, a hydraulic system in an electric axle is provided which comprises a housing including a plurality of sections that enclose an electric motor and a gearbox; a hydraulic pump coupled to an outer surface of one of the plurality of housing sections, configured to receive a fluid from a sump, and configured to supply pressurized fluid to a first solenoid valve through a plurality of fluid passages; and a first clutch arranged in the gearbox and configured to receive the pressurized fluid from the first solenoid valve through a hydraulic passage; wherein the hydraulic passage is internally routed through the one of the plurality of housing sections.

In another aspect, a method for operation of a hydraulic system in an electric axle is provided which comprises flowing a lubricant to a plurality of solenoid valves from a hydraulic pump through a pressurized plenum that extends along an exterior surface of a section of a housing that encloses a gearbox; and during a first condition, engaging a first hydraulically operated clutch using lubricant flow control between a first one of the plurality of solenoid valves and the first hydraulically operated clutch; wherein a plurality of hydraulic passages is internally routed through the section of the housing and provide fluidic communication between the plurality of solenoid valves and the hydraulic pump. In one example, the method may further comprise, during a second condition, engaging a second hydraulically operated clutch through lubricant flow control between a second one of the plurality of solenoid valves and the hydraulic pump. In yet another example, the method may further comprise, during a third condition, engaging a park lock device via lubricant flow control between a second one of the plurality of solenoid valves and the hydraulic pump.

In yet another aspect, a hydraulic system in an electric axle of a vehicle, is provided which comprises a housing including a plurality of sections that enclose an electric motor and a gearbox; a hydraulic pump coupled to an outer surface of one of the plurality of housing sections, receiving a fluid from a sump, and supplying pressurized fluid to a first solenoid valve and a second solenoid valve; a first clutch receiving the pressurized fluid from the first solenoid valve via a first hydraulic that is passage routed through one of the plurality of housing sections; and a second clutch receiving the pressurized fluid from the second solenoid valve via a second hydraulic passage that is routed through one of the plurality of housing sections.

In any of the aspects or combinations of the aspects, the first condition may be a condition where the gearbox transitions into a first gear mode and the second condition may be a condition where the gearbox transitions into a second gear mode from the first gear mode.

In any of the aspects or combinations of the aspects, the hydraulic passage may be cast into the one of the plurality of housing sections.

In any of the aspects or combinations of the aspects, the hydraulic passage may be machined into the one of the plurality of housing sections.

In any of the aspects or combinations of the aspects, the hydraulic pump may be fluidically coupled to the first solenoid valve via a pressurized cavity that extends along an exterior surface of one of the plurality of housing sections that enclose the gearbox.

In any of the aspects or combinations of the aspects, the first clutch may be designed to selectively engage a first gear set in the gearbox.

In any of the aspects or combinations of the aspects, the system may further comprise a second solenoid valve designed to control a second clutch that is configured to selectively engage a second gear set in the gearbox.

In any of the aspects or combinations of the aspects, the system may further comprise a third solenoid valve designed to control a park lock device.

In any of the aspects or combinations of the aspects, the first clutch may be a friction clutch and the second clutch may be a dog clutch.

In any of the aspects or combinations of the aspects, the one of the plurality of housing sections may include an axle shaft opening.

In any of the aspects or combinations of the aspects, the plurality of housing sections may enclose a final drive and a differential rotationally coupled to a pair of axle shafts.

In any of the aspects or combinations of the aspects, at least one of the first hydraulic passage and the second hydraulic passage may be cast into the one of the plurality of housing sections.

In any of the aspects or combinations of the aspects, at least one of the first hydraulic passage and the second hydraulic passage may be machined into the one of the plurality of housing sections.

In any of the aspects or combinations of the aspects, the system may further comprise a controller including executable instructions stored in non-transitory memory that cause the controller to: engage and disengage the first and second clutches through operation of the first solenoid valve and second solenoid valve.

In any of the aspects or combinations of the aspects, the first solenoid valve and the second solenoid valve may be fluidly coupled to the hydraulic pump via a feeder conduit.

In another representation, a hydraulic actuation system in an electrified axle is provided that comprises a pump coupled to an axle housing that encloses a gearbox and fluidly coupled to multiple actuation solenoids via a hydraulic fluid plenum and a plurality of hydraulic passages routed internally in an enclosure whose boundary is defined by the axle housing, wherein the axle housing encloses a differential rotationally coupled to axle shafts in a solid beam axle.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic system in an electric axle, comprising:
a housing including a plurality of housing sections that enclose an electric motor and a gearbox;
a hydraulic pump coupled to an outer surface of one of the plurality of housing sections, configured to receive a fluid from a sump, and configured to supply pressurized fluid to a first solenoid valve through one of a plurality of fluid passages, wherein the first solenoid valve is one of a plurality of solenoid valves, and wherein each of the plurality of solenoid valves is accessible from an exterior of the housing; and
a first clutch arranged in the gearbox and configured to receive the pressurized fluid from the first solenoid valve through a hydraulic passage;
wherein the hydraulic passage is internally routed through the one of the plurality of housing sections.

2. The hydraulic system of claim 1, wherein the hydraulic passage is cast or machined into the one of the plurality of housing sections.

3. The hydraulic system of claim 1, wherein the plurality of housing sections comprises at least three housing sections.

4. The hydraulic system of claim 1, wherein the hydraulic pump is fluidically coupled to the first solenoid valve via a pressurized cavity that extends along an exterior surface of one of the plurality of housing sections that enclose the gearbox.

5. The hydraulic system of claim 1, wherein the first clutch is designed to selectively engage a first gear set in the gearbox.

6. The hydraulic system of claim 5, further comprising a second solenoid valve designed to control a second clutch that is configured to selectively engage a second gear set in the gearbox.

7. The hydraulic system of claim 6, further comprising a third solenoid valve designed to control a park lock device.

8. The hydraulic system of claim 6, wherein the first clutch is a friction clutch and the second clutch is a dog clutch.

9. The hydraulic system of claim 1, wherein one of the plurality of housing sections includes an axle shaft opening.

10. The hydraulic system of claim 1, wherein the plurality of housing sections encloses a final drive and a differential rotationally coupled to a pair of axle shafts.

11. A method for operation of a hydraulic system in an electric axle, comprising:
flowing a lubricant to a plurality of solenoid valves from a hydraulic pump through a pressurized plenum that extends along an exterior surface of a housing, the pressurized plenum extending along the exterior surface of the housing at a section that encloses a gearbox; and
during a first condition, engaging a first hydraulically operated clutch using lubricant flow control between a first one of the plurality of solenoid valves and the first hydraulically operated clutch, wherein each of the plurality of solenoid valves is accessible from an exterior of the housing;
wherein a plurality of hydraulic passages are internally routed through the section of the housing and provide fluidic communication between the plurality of solenoid valves and the hydraulic pump.

12. The method of claim 11, further comprising, during a second condition, engaging a second hydraulically operated clutch through lubricant flow control between a second one of the plurality of solenoid valves and the hydraulic pump.

13. The method of claim 12, wherein the first condition is a condition where the gearbox transitions into a first gear mode and the second condition is a condition where the gearbox transitions into a second gear mode from the first gear mode.

14. The method of claim 11, further comprising, during a third condition, engaging a park lock device via lubricant flow control between a second one of the plurality of solenoid valves and the hydraulic pump.

15. A hydraulic system in an electric axle of a vehicle, comprising:
a housing including a plurality of housing sections that enclose an electric motor and a gearbox;
a hydraulic pump coupled to an outer surface of one of the plurality of housing sections, receiving a fluid from a sump, and supplying pressurized fluid to a first solenoid valve and a second solenoid valve, wherein the first solenoid valve and the second solenoid valve are accessible from an exterior of the housing;
a first clutch receiving the pressurized fluid from the first solenoid valve via a first hydraulic passage that is routed through one of the plurality of housing sections; and
a second clutch receiving the pressurized fluid from the second solenoid valve via a second hydraulic passage that is routed through one of the plurality of housing sections.

16. The hydraulic system of claim 15, wherein at least one of the first hydraulic passage and the second hydraulic passage is cast into the one of the plurality of housing sections.

17. The hydraulic system of claim 15, wherein at least one of the first hydraulic passage and the second hydraulic passage is machined into the one of the plurality of housing sections.

18. The hydraulic system of claim 15, further comprising a controller including executable instructions stored in non-transitory memory that cause the controller to:
  engage and disengage the first clutch and the second clutch through operation of the first solenoid valve and the second solenoid valve.

19. The hydraulic system of claim 15, wherein the first solenoid valve and the second solenoid valve are fluidly coupled to the hydraulic pump via a feeder conduit.

20. The hydraulic system of claim 15, wherein the hydraulic pump includes an outlet conduit that extends through and is in sealing engagement with one of the plurality of housing sections.

\* \* \* \* \*